(12) United States Patent
Deniau et al.

(10) Patent No.: US 9,610,809 B2
(45) Date of Patent: Apr. 4, 2017

(54) BAROMETRIC PRESSURE COMPENSATION FOR TIRE PRESSURE MONITORING SYSTEM TOOL

(71) Applicant: Continental Automotive Systems, Inc., Auburn Hills, MI (US)

(72) Inventors: Jean-Christophe Deniau, Fenton, MI (US); Yasser Gad, Macomb, MI (US); Brian J Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 95 days.

(21) Appl. No.: 14/564,230

(22) Filed: Dec. 9, 2014

(65) Prior Publication Data

US 2016/0159172 A1    Jun. 9, 2016

(51) Int. Cl.
*G08B 21/00* (2006.01)
*B60C 23/04* (2006.01)

(52) U.S. Cl.
CPC ...... *B60C 23/0486* (2013.01); *B60C 23/0471* (2013.01); *B60C 23/0479* (2013.01)

(58) Field of Classification Search
CPC .................................................. B60C 23/0486
USPC ...................... 340/442, 447; 73/146.4, 146.5
See application file for complete search history.

(56) References Cited

U.S. PATENT DOCUMENTS

| | | | |
|---|---|---|---|
| 8,255,117 B2* | 8/2012 | Bujak | B60G 17/0165 340/442 |
| 2002/0130771 A1 | 9/2002 | Osborne et al. | |
| 2008/0164988 A1* | 7/2008 | DeKeuster | B60C 23/0479 340/442 |
| 2009/0256690 A1* | 10/2009 | Golenski | G08G 1/205 340/425.5 |
| 2011/0080282 A1 | 4/2011 | Kleve et al. | |
| 2013/0145834 A1 | 6/2013 | Mouchet | |

OTHER PUBLICATIONS

International Search Report and Written Opinion dated Feb. 23, 2016 from corresponding International Patent Application No. PCT/US2015/064596.

* cited by examiner

*Primary Examiner* — Jeffery Hofsass

(57) ABSTRACT

At a portable low frequency (LF) tool, a sensor reading of a tire pressure is received. A determination is made of a barometric pressure adjustment based upon received inputs. The adjustment is applied to the reading of the tire pressure to form an adjusted pressure. The adjusted pressure is presented to a user at the portable LF tool.

15 Claims, 4 Drawing Sheets

BAROMETRIC PRESSURE COMPENSATION FOR TIRE PRESSURE MONITORING SYSTEM TOOL

TECHNICAL FIELD

This application relates to the operation of a tire pressure monitoring system and compensations for barometric pressure.

BACKGROUND OF THE INVENTION

Tire pressure monitoring sensors obtain the pressure of the tire. Such sensors might also obtain other information such as the temperature of the air in the tire. Once these devices obtain this information, the information may be sent to a receiver in the vehicle of the vehicle. The receiver may analyze the tire pressure information and if the pressure is too low, may issue a warning to the driver of the vehicle. The instrument panel of the vehicle is coupled to the receiver so that the pressure information may be displayed or otherwise presented to occupants of the vehicle.

Direct TPM sensors measure the air pressure inside the tire in which they are disposed with respect to a stable, common reference vacuum. Before being transmitted to the receiver, a first compensation is typically made to offset the vacuum. The reported tire pressure on the instrument panel of some vehicles also takes into consideration the atmospheric pressure available at the vehicle. Thus, before being presented on the instrument panel a second compensation is made to take into consideration the atmospheric pressure where the vehicle is located.

In some situations, a repair of the tire utilizes a portable low frequency (LF) tool to make the repair. Under such circumstances, the tool may receive RF data from the TPM sensor including the measured pressure of the tire. As mentioned, this measured pressure made by the TPM sensor is with respect to vacuum and when transmitted to the tool and as mentioned above, the received pressure is adjusted to offset the vacuum to 1 bar. Consequently, the pressure displayed to an occupant of the vehicle may likely be different than the pressure that is presented to a user of the tool.

Since the displayed pressures may be different, confusion may be created among drivers and service personal at repair shops. These problems have generally increased user concern with previous approaches.

BRIEF DESCRIPTION OF THE DRAWINGS

For a more complete understanding of the disclosure, reference should be made to the following detailed description and accompanying drawings wherein.

Figure 1:
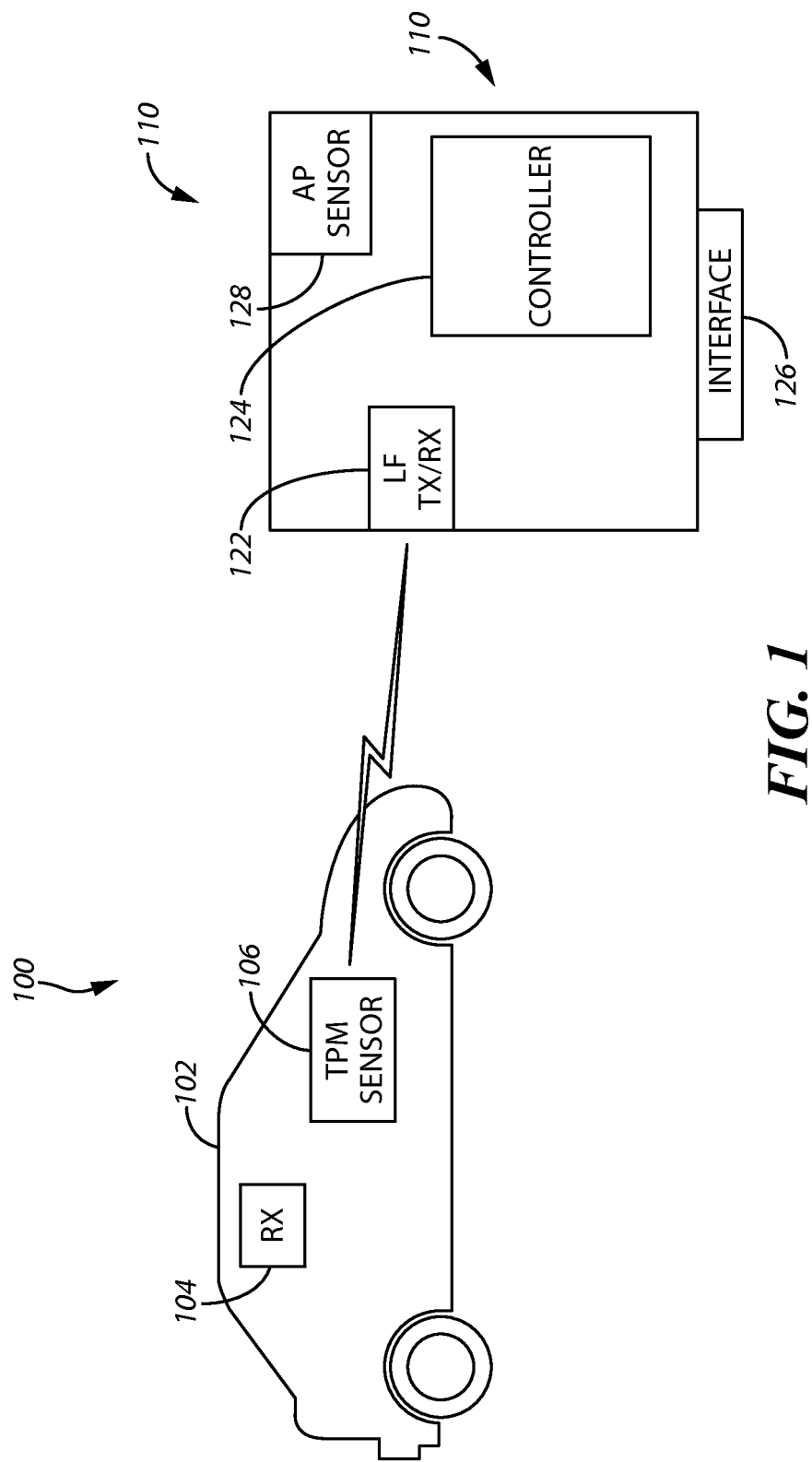
FIG. 1 comprises a block diagram of a portable TPM programming tool and system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that provide a portable programming tool that presents an accurately compensated barometric pressure to a user of a portable TPM programming tool. The presentation of barometric pressure information is made at the tool and the pressures so-presented match (or at least closely match) those presented to the user of the vehicle via a receiver system at the vehicle. The approaches are easy and cost effective to use and implement, and require a minimum of alterations to existing systems and tools.

In many of these embodiments and at a portable low frequency (LF) tool a sensor reading of a tire pressure is received. A barometric pressure adjustment is determined based upon received inputs. The adjustment is applied to the reading of the tire pressure to form an adjusted pressure. The adjusted pressure is presented to a user at the portable LF tool.

In some aspects, the received inputs are from a barometric pressure sensor disposed at the tool. In other aspects, the received inputs are RF signals received from a portable device. In still other aspects, the received inputs are signals from an external network. The external network may be one or more of the internet, a local area network, a wide area network, or a cellular network.

In other examples, the adjusted pressure is presented on a graphical user interface at the LF tool. In still other examples, the adjusted pressure is transmitted to a third party.

In others of these embodiments, a portable low frequency (LF) tire pressure programming tool includes a transmitter/receiver for receiving a sensor reading of a tire pressure; a user interface; and a controller. The controller is coupled to the transmitter/receiver and the interface, and the controller is configured to determine a barometric pressure adjustment based upon received inputs, apply the adjustment to the sensor reading of the tire pressure to form an adjusted pressure, and present the adjusted pressure via the interface.

In still others of these embodiments, a computer usable non-transitory medium has a computer readable program code embodied therein, said computer readable program code is adapted to be executed to implement a method of determining barometric pressure. The method comprises at a portable low frequency (LF) tool receiving a sensor reading of a tire pressure. A barometric pressure adjustment is determined based upon received inputs. The adjustment is applied to the reading of the tire pressure to form an adjusted pressure. The adjusted pressure is presented to a user at the portable LF tool.

Referring now to FIG. 1, a TPM system 100 includes a vehicle 102 with a receiver 104 and a tire pressure monitoring (TPM) sensor 106. The vehicle may have four TPM sensors (one for each tire), but for simplicity only one is illustrated here. The TPM sensor 106 is any TPM sensor that measures the pressure of the tire. In one aspect, the measured pressure is in reference to vacuum.

The system 100 includes a programming tool 110, which may be hand-held. The programming tool 110 includes a low frequency (LF) transmitter receiver 122, a controller 124, a user interface 126, and an atmospheric pressure sensor 128. The programming tool 110 can be used to program configuration information into the TPM sensor 106. In addition, during repairs, checks, or other activity involving the TPM sensor 106, the tool 110 may be used to trigger the sensor 106 to provide information, to re-configure or adjust the sensor 106, or cause the sensor to operate in a particular mode of operation to mention a few examples.

The LF transmitter and receiver 122 transmits and receives low frequency signals from the TPM sensor 106. The controller 124 is any processing device that performs compensation functions described below. The user interface 126 is any interface that allows communication with a user. In these regards, the interface 126 may include screens, buttons, or any displays that receive communications/commands from a user, and display information to a user. The atmospheric pressure sensor 128 is any sensor that senses the absolute barometric pressure at the location where the tool is disposed.

The tire pressure measured by the TPM sensor 106 may be transmitted wirelessly (or otherwise) to the tool 110. The tool 110 may compensate for the atmospheric pressure before the compensated pressure is displayed on the interface 126 of the tool 110 to the user.

In one example:

$$P(\text{compensated})=P(\text{sensor})+(P(\text{default})-P(\text{measured}))$$
where:

P(compensated) is the compensated tire pressure displayed to the user at the tool 110; P(sensor) is the pressure retuned by the TPM sensor 106; P(default) is 101.325 kPa (or 1 bar); and P(measured) is the absolute measured pressure that is measured by the AP sensor 128.

The receiver 104 may perform a similar calculation and compensation so that it will display the same pressure as that displayed on the tool.

Figure 2:
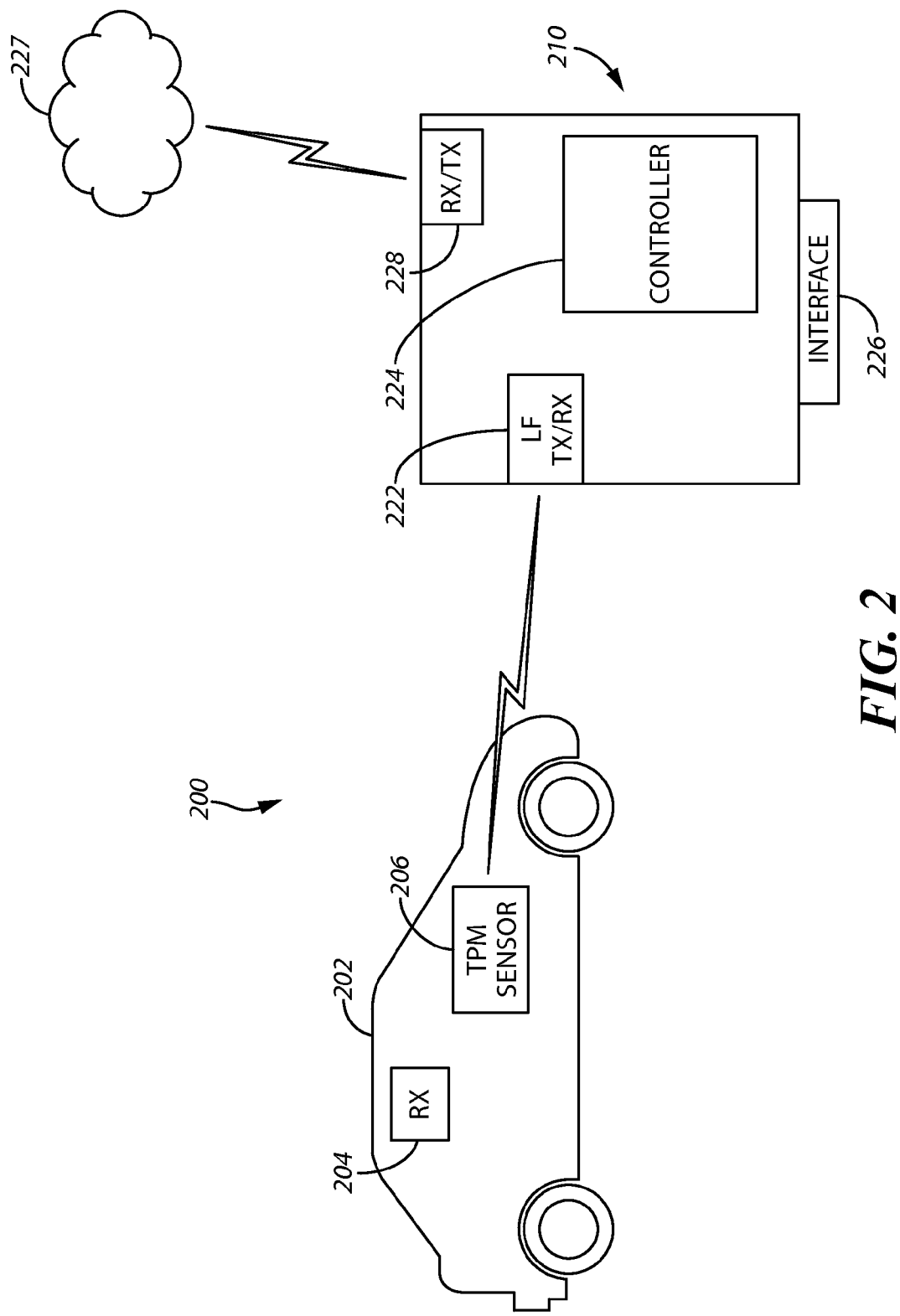
FIG. 2 comprises a block diagram of another portable TPM programming tool and system according to various embodiments of the present invention.

Referring now to FIG. 2, a TPM system 200 includes a vehicle 202 with a receiver 204 and a tire pressure monitoring (TPM) sensor 206. The vehicle may have four TPM sensors (one for each tire), but for simplicity only one is illustrated here. The TPM sensor 206 is any TPM sensor that measures the pressure of the tire. In one aspect, the measured pressure is in reference to vacuum.

The system 200 includes a programming tool 210, which may be hand-held. The programming tool 210 includes a low frequency (LF) transmitter receiver 222, a controller 224, a user interface 226, and a transmitter/receiver 228. The transmitter/receiver 228 communicates with a network 227. The network 227 may be any type of network including any combination of a cellular network, the Internet, a wide area network to mention a few examples. As described below, the network 227 supplies barometric pressure information regarding the barometric pressure at the tool 210. This information may be stored at the network 227 and may be obtained by the network from any source (e.g., a local weather station in the city where the tool 210 is located).

The programming tool 210 can be used to program configuration information into the TPM sensor 206. In addition, during repairs, checks, or other activity involving the TPM sensor 206, the tool 210 may be used to trigger the sensor 206 to provide information, to re-configure or adjust the sensor 206, or cause the sensor to operate in a particular mode of operation to mention a few examples.

The LF transmitter and receiver 222 transmits and receives low frequency signals from the TPM sensor 206. The controller 224 is any processing device that performs compensation functions described below. The user interface 226 is any interface that allows communication with a user. The user interface 226 may include screens, buttons, or any displays that receive communications/commands from a user, and display information to a user.

The pressure measured by the TPM sensor 206 may be transmitted wirelessly (or otherwise) to the tool 210. The tool 210 may compensate for the atmospheric pressure before the compensated pressure is displayed on the interface 226 of the tool 210 to the user.

In one example:

$$P(\text{compensated})=P(\text{sensor})+(P(\text{default})-P(\text{measured}))$$
where:

P(compensated) is the compensated tire pressure displayed to the user at the tool 210; P(sensor) is the pressure retuned by the TPM sensor 206; P(default) is 101.325 kPa (or 1 bar); and P(measured) is the absolute measured pressure that is returned from the network 227. The receiver 204 may perform a similar calculation and compensation so that it will display the same pressure as that displayed on the tool.

Figure 3:
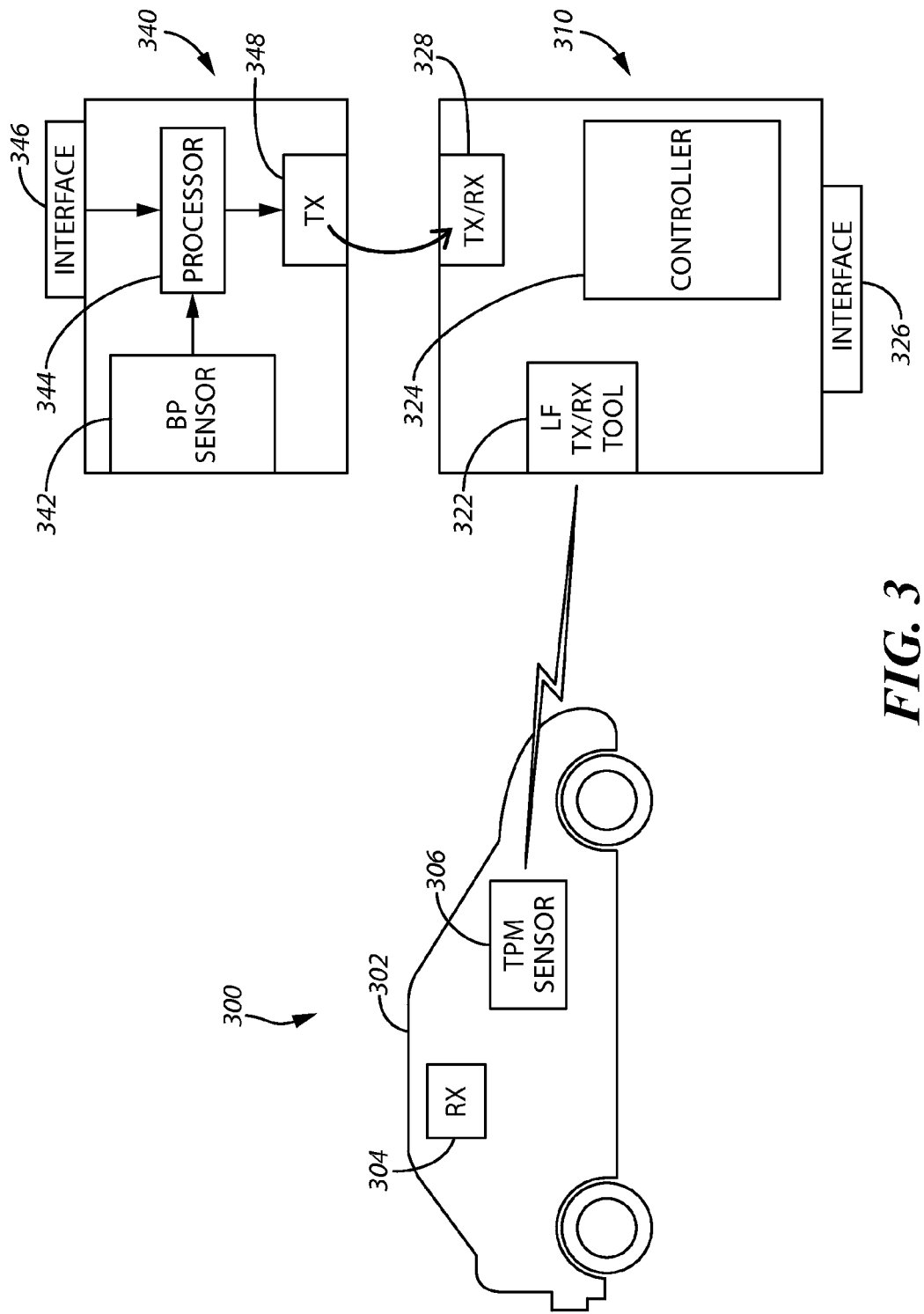
FIG. 3 comprises a block diagram of yet another portable TPM programming tool and system according to various embodiments of the present invention.

Referring now to FIG. 3, a TPM system 300 includes a vehicle 302 with a receiver 304 and a tire pressure monitoring (TPM) sensor 306. The vehicle may have four TPM sensors (one for each tire), but for simplicity only one is illustrated here. The TPM sensor 306 is any TPM sensor that measures the pressure of the tire. In one aspect, the measured pressure is in reference to vacuum.

The system 300 includes a programming tool 310, which may be hand-held. The programming tool 310 includes a low frequency (LF) transmitter receiver 322, a controller 324, a user interface 326, and a transmitter/receiver 328. The transmitter/receiver 328 receives absolute barometric information from an external tool 340, which also may be hand-held. The external tool 340 includes a barometric pressure sensor 342, a processor 344, an interface 346, and a transmitter 348. The barometric pressure sensor 342 measures the local absolute barometric pressure at the location of the tool 310. The processor 344 receives a signal from the interface 346 via transmitter 348 to the tool 310. The interface 346 may be a push button, in one example. Other examples are possible.

The programming tool 310 can be used to program configuration information into the TPM sensor 306. In addition, during repairs, checks, or other activity involving the TPM sensor 306, the tool 310 may be used to trigger the sensor 306 to provide information, to re-configure or adjust the sensor 306, or cause the sensor to operate in a particular mode of operation to mention a few examples.

The LF transmitter and receiver 322 transmits and receives low frequency signals from the TPM sensor 306. The controller 324 is any processing device that performs compensation functions described below. The user interface 326 is any interface that allows communication with a user. The user interface 326 may include screens, buttons, or any displays that receive communications/commands from a user, and display information to a user.

The pressure measured by the TPM sensor 306 may be transmitted wirelessly (or otherwise) to the tool 310. The tool 310 may compensate for the atmospheric pressure before the compensated pressure is displayed on the interface 326 of the tool 310 to the user.

In one example:

$$P(\text{compensated}) = P(\text{sensor}) + (P(\text{default}) - P(\text{measured}))$$
where:

P(compensated) is the compensated tire pressure displayed to the user at the tool 310; P(sensor) is the pressure retuned by the TPM sensor 306; P(default) is 101.325 kPa (or 1 bar); and P(measured) is the absolute measured pressure that is returned by the external tool 340.

The receiver 304 may perform a similar calculation and compensation so that it will display the same pressure as that displayed on the tool.

Figure 4:
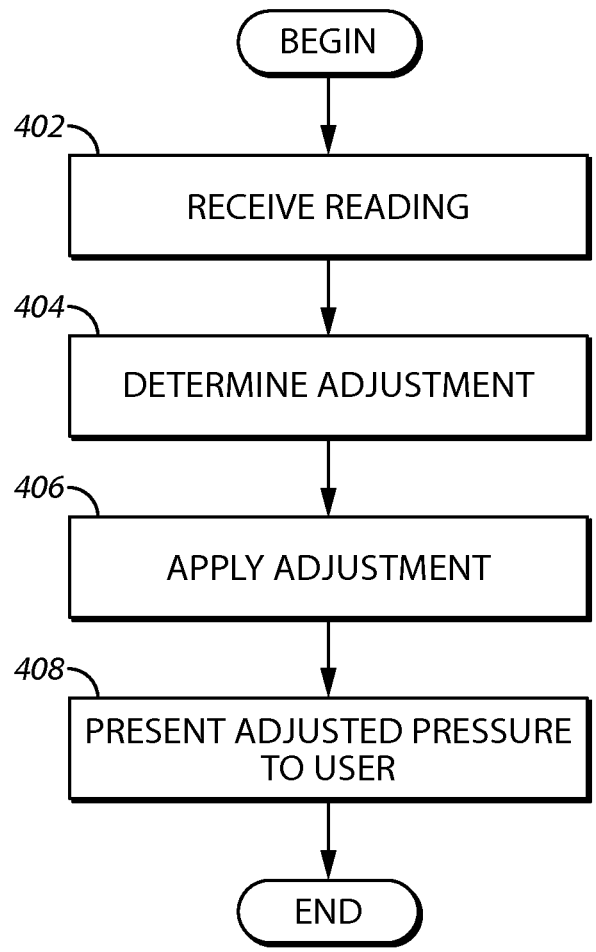
FIG. 4 comprises a flowchart of the operation of a portable TPM programming tool according to various embodiments of the present invention.

Referring now to FIG. 4, one example of an approach for pressure compensation at an LF programming tool is described. St step 402, and at the portable low frequency (LF) tool, a sensor reading of a tire pressure is received.

At step 404, a determination of a barometric pressure adjustment is made based upon received inputs. In one example: P(compensated)=P(sensor)+(P(default)−P(measured)) where: P(compensated) is the compensated tire pressure displayed to the user at the tool; P(sensor) is the pressure retuned by the TPM sensor; P(default) is 101.325 kPa; and P(measured) is the absolute measured pressure that is based on received inputs. In one example, the received inputs is an absolute barometric pressure reading from a sensor at the portable tool. In another example, the received inputs is the absolute measured pressure at the location of the tool that is received from a remote network (e.g., the internet). In still another example, the inputs are received from an external tool. Other examples are possible.

At step 406, the adjustment to the reading of the tire pressure is applied to form an adjusted pressure. At step 408, the adjusted pressure is presented to a user at the portable LF tool.

It should be understood that any of the devices described herein (e.g., the tools, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, the method comprising:
   at a portable low frequency (LF) tool:
     receiving a sensor reading of a tire pressure;
     receiving inputs regarding barometric pressure from a source external from the portable LF tool;
     determining a barometric pressure adjustment based upon the received inputs;
     applying the adjustment to the reading of the tire pressure to form an adjusted pressure;
     presenting the adjusted pressure to a user at the portable LF tool.

2. The method of claim 1, wherein the received inputs are RF signals received from a portable device.

3. The method of claim 1, wherein the received inputs are signals from an external network.

4. The method of claim 3, wherein the external network comprises the internet, a local area network, a wide area network, or a cellular network.

5. The method of claim 1, wherein the adjusted pressure is presented on a graphical user interface at the LF tool.

6. The method of claim 1, wherein the adjusted pressure is transmitted to a third party.

7. A portable low frequency (LF) tire pressure programming tool, the tool comprising:
   a first transmitter/receiver for receiving a sensor reading of a tire pressure;
   a second transmitter/receiver for receiving inputs regarding barometric pressure from a source external from the portable LF tire pressure programming tool;
   a user interface;
   a controller, the controller being coupled to the first transmitter/receiver, the second transmitter/receiver, and the interface, the controller being configured to determine a barometric pressure adjustment based upon the received inputs, apply the adjustment to the sensor reading of the tire pressure to form an adjusted pressure, and present the adjusted pressure via the interface.

8. The tool of claim 7, wherein the received inputs are received from an external portable device that is separate from the tool.

9. The tool of claim 7, wherein the received inputs are from an external network.

10. The tool of claim 9, wherein the external network comprises the internet, a local area network, a wide area network, or a cellular network.

11. The tool of claim 7, wherein the interface is a graphical user interface.

12. The tool of claim 7, wherein the adjusted pressure is transmitted to a third party via the transmitter/receiver.

13. A computer usable non-transitory medium having a computer readable program code embodied therein, said computer readable program code adapted to be executed to implement a method of determining barometric pressure, the method comprising:
- at a portable low frequency (LF) tool:
    - receiving a sensor reading of a tire pressure;
    - receiving inputs regarding barometric pressure from a source external from the portable LF tool;
    - determining a barometric pressure adjustment based upon the received inputs;
    - applying the adjustment to the reading of the tire pressure to form an adjusted pressure;
    - presenting the adjusted pressure to a user at the portable LF tool.

14. The computer usable non-transitory medium of claim 13, wherein the received inputs are RF signals received from a portable device.

15. The computer usable non-transitory medium of claim 13, wherein the received inputs are signals from an external network.

* * * * *